3,454,580
CERTAIN 3-γ-TROPANYL OXIMINO DERIVATIVES OF DIBENZOCYCLOHEPTENES AND DIBENZO-CYCLOOCTENES
Cornelis van der Stelt, Haarlem, Netherlands, assignor to N.V. Koninklijke Pharmaceutische Fabrieken v/h Brocades-Stheeman & Pharmacia, Amsterdam, Netherlands
No Drawing. Filed Dec. 6, 1967, Ser. No. 688,325
Claims priority, application Great Britain, Dec. 12, 1966, 55,609/66
Int. Cl. C07d *43/06;* A61k *27/00*
U.S. Cl. 260—292          10 Claims

ABSTRACT OF THE DISCLOSURE

The disclosure of this application relates to therapeutic compounds having the formula

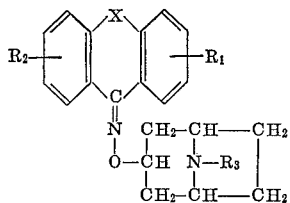

wherein X represents a —CH$_2$—CH$_2$—,

—CH$_2$—CH$_2$—CH$_2$— or —CH=CH— group, R$_1$ and R$_2$ are the same or different and each represents hydrogen, halogen, or a straight or branched chain alkyl group of less than six carbons, and R$_3$ represents a hydrogen atom, or an alkyl group of one to eight carbon atoms and their pharmaceutically acceptable acid-addition and quaternary ammonium salts. The compounds of this invention possess local anesthetic, anti-histaminic, musculotrope spasmolytic and central anti-cholinergic activity.

---

This invention relates to new ethers of ketoximes, their acid-addition and quaternary ammonium salts, to processes for their preparation and to pharmaceutical preparations containing them.

According to the present invention there are provided the new ethers of ketoximes of the Formula I

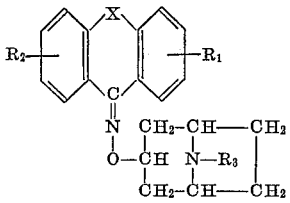

wherein X represents a —CH$_2$—CH$_2$—,

—CH$_2$—CH$_2$—CH$_2$— or —CH=CH— group, R$_1$ and R$_2$ are the same or different and each represents hydrogen, halogen, or a straight or branched chain alkyl group of less than six carbons, and R$_3$ repersents a hydrogen atom, or an alkyl group of one to eight carbon atoms and their pharmaceutically acceptable acid-addition and quaternary ammonium salts.

It has been found that the compounds of Formula I possess therapeutic properties. They are local anesthetics, strong anti-histaminics and fairly good musculotrope spasmolytic agents, and their central anti-cholinergic activity makes them useful anti-Parkinson drugs. Preferred compounds are those wherein R$_1$ and R$_2$ are both hydrogen and R$_3$ is a methyl group, i.e., the tropanyl ethers of 5H-dibenzo[a,d]cyclohepten-5 - one oxime, 10,11 - dihydro-5H-dibenzo[a,d]cyclohepten-5-one oxime and 6,7-dihydrodibenzo[a,d]cycloocten - 12(5H) - one oxime and their acid-addition and quaternary ammonium salts.

All of the compounds of this invention possess local anesthetic and anti-histaminic activity and may be administered for these purposes to mammals (e.g., dogs, cats, cows, horses, and the like). For use as local anesthetics, they may be administered subcutaneously at dosages of from about 5 to 10 mg./kg. For use as anti-histaminics, they may be administered orally at dosages of from about 1 to 3 mg./kg. daily.

In addition, the compounds of this invention illustrated by Formula I wherein X represents —CH=CH— possess pronounced musculotrope spasmolytic and central anti-cholinergic activity when administered orally to mammals (e.g., dogs, cats, cows, horses, and the like) in daily dosages of about 2 to 5 and 1 to 2 mg./kg., respectively.

When used for therapeutic purposes, the new compounds may be employed as such or in the form of pharmaceutically acceptable acid-addition or quaternary ammonium salts. The term "pharmaceutically acceptable" is used to indicate that the salts are not harmful to the animal organism when used in therapeutic doses.

Acids from which the acid-addition salts may be prepared include organic and inorganic acids. The inorganic acids include the hydrohalic acids (e.g., hydrochloric and hydrobromic acids), sulfuric, sulfamic, nitric and phosphoric acids. The organic acids include aliphatic monocarboxylic acids such as formic, acetic, propionic, pivalic, stearic and palmitic acids and the like; aliphatic hydroxy monocarboxylic acids such as gluconic, glycolic and lactic acids and the like; alphatic lower alkoxy monocarboxylic acids such as methoxy-acetic and ethoxy-acetic acids and the like; aliphatic lower alkanoyl monocarboxylic acids such as pyruvic acid and the like; aliphatic halogeno monocarboxylic acids such as chloroacetic, dichloroacetic, trichloroacetic and bromoacetic aids and the like; aliphatic dicarboxylic acids such as oxalic, malonic, succinic, methylsuccinic, dimethylsuccinic, glutaric, α-methylglutaric, α,α-dimethylglutaric, β-methylglutaric, itaconic, homoitaconic, maleic, citraconic, homocitraconic, pyrocinchonic, xeronic and fumaric acids and the like; aliphatic hydroxy dicarboxylic acids such as malic and tartaric acids and the like; aliphatic lower alkoxy dicarboxylic acids such as α,β-dimethoxysuccinic and ethoxymaleic acids and the like; aliphatic halogeno dicarboxylic acids such as chlorosuccinic and bromosuccinic acids and the like; aliphatic tricarboxylic acids such as aconitic and tricarballylic acids and the like; aliphatic hydroxycarboxylic acids such as citric acid and the like; aryl monocarboxylic or aryl aliphatic monocarboxylic acids such as benzoic, p-aminobenzoic, cinnamic, mandelic, salicylic, 4-aminosalicylic, 2-phenoxybenzoic, 2-acetoxybenzoic and nicotinic acids and the like; theophyllineacetic acid and the like as well as 8-halotheophyllineacetic acids such as 8-chlorotheophyllineacetic and 8-bromotheophyllineacetic and the like; aryl dicarboxylic acids such as phthalic and pamoic acids and the like; amino acids such as methionine, trytophane, lysine, arginine, aspartic, glutamic and hydroxyglutamic, and the like; organic sulfonic acids such as methane sulfonic, ethane sulfonic, benzene sulfonic, toluene sulfonic and camphor sulfonic acids and the like; hydroxy-alkane sulfonic acids such as 2-hydroxyethane sulfonic acids and the like; organic sulfamic acids such as cyclohexane sulfamic acid and the like as well as ascorbic acid. The quaternary salts coming within the purview of this invention include those formed with alkyl halides such as methyl chloride, isobutyl bromide, dodecyl chloride, cetyl iodide and the like; benzyl halides such as benzyl chloride and the like; and di-lower alkyl sulfates such as dimethyl sulfate and the like.

According to a feature of the invention, the compounds of Formula I are prepared by converting a ketoxime of the formula:

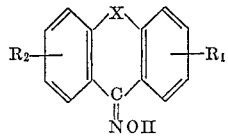
II wherein X, $R_1$ and $R_2$ are as hereinbefore defined, into the corresponding alkali metal compound and reacting the latter with a compound of the formula:

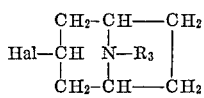
III wherein Hal is halogen (e.g., chloro-, bromo-, fluoro- or iodo-), and $R_3$ is as hereinbefore defined.

The conversion of the ketoxime of Formula II into an alkali metal compound may be effected by methods known per se. The ketoxime may, for example, be reacted with an alkali metal alkoxide (e.g., sodium ethoxide or lithium ethoxide), which is dissolved in an alcohol such as ethanol. Solutions or suspensions of an alkali metal or an alkali metal hydride in an inert organic solvent, such as benzene or toluene, may also be used as reagent. The etherification reaction is advantageously carried out by refluxing the reactants in an inert organic solvent (e.g., benzene or toluene) or in an alcohol (e.g., ethanol).

The ketoximes of Formula II may be prepared by reacting the corresponding ketone with hydroxylamine. The hydroxylamine may conveniently be in the form of a solution of hydroxylamine hydrochloride or other salt in pyridine or other solvent.

Compounds of Formula III may be prepared by, for example, reacting thionyl chloride with a compound of the formula:

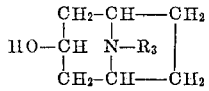
IV wherein $R_3$ is as hereinbefore defined.

Compounds of Formula IV in which $R_3$ is an alkyl group of two to eight carbon atoms may be prepared by, (a) reacting nortropine with an acid halide of the general formula:

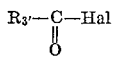
V wherein Hal is as hereinbefore defined, and $R_3$ represents an alkyl group containing one to seven carbon atoms and reducing the carbonyl group in the resulting amide of the formula:

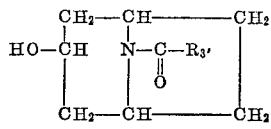
VI wherein $R_3$ is as hereinbefore defined, by known methods, e.g., with lithium aluminum hydride using an inert solvent medium such as ether or tetrahydrofuran, or by (b) reacting nortropine, the hydroxyl group of which may have been effectively protected (for example with an acyl residue), with an aldehyde of the formula:

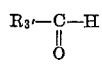
VII wherein $R_3$ is as hereinbefore defined, and simultaneously effecting a catalytic hydrogenation using, for example, Raney nickel as catalyst.

According to another feature of the invention, compounds of Formula I in which $R_3$ represents an alkyl group of two to eight carbon atoms are prepared by replacing the hydrogen atom attached to the nitrogen atom in a compound of the formula:

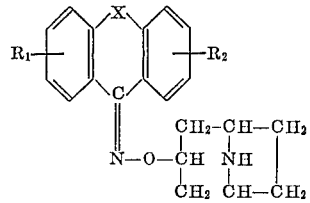
VIII wherein X, $R_1$ and $R_2$ are as hereinbefore defined, by the appropriate radical by methods known per se for the alkylation of secondary amines. The substitution may be effected, for example, by reacting a compound of the Formula VIII with an alkyl halide, the reaction then being preferably carried out by heating the reactants in an inert, anhydrous organic solvent, such as benzene, toluene or xylene, and in the presence of an acid-binding agent.

Alkylation of the secondary amino group of compounds of Formula VIII may also be effected by reacting the nortropane compound with an acid halide of Formula V and reducing the carbonyl group in the resulting amide of the formula:

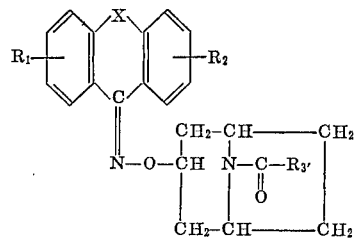
IX wherein $R_1$, $R_2$, $R_3$ and X are as hereinbefore defined, to methylene, i.e., —$CH_2$—, by methods known per se, for example with lithium aluminum hydride.

According to a further feature of the invention, compounds of Formula VIII are prepared by removing an alkyl substituent, $R_3$, in a compound of Formula I. The dealkylation may take place by methods known per se for the de-alkylation of mono-alkylamino compounds. De-methylation may be effected, for example, by replacement of the methyl group with a cyano group through treatment of the tropane derivative with a cyanogen halide, then hydrolysis of the resultant N-cyano-nortropane compound followed by recarboxylation of the N-carboxy-nortropane compound thus formed. De-methylation may also be effected by reacting the tropane compound with a halogenocarbonic acid ester of the formula:

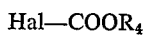
Hal—COOR$_4$    X in which $R_4$ is an alkyl (e.g., methyl, hexyl, isopropyl) and Hal is as hereinbefore defined, followed by hydrolysis and decarboxylation of the compound obtained of the formula:

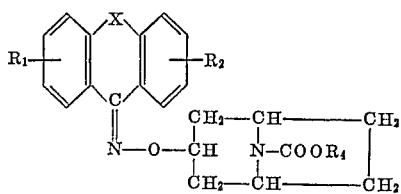
XI in which X, $R_1$, $R_2$ and $R_4$ are as hereinbefore defined.

According to another feature of the invention, the compounds of Formula VIII are prepared from a compound of Formula I in which $R_3$ is a benzyl group by de-benzylation by methods known per se for the de-benzylation of benzylamino compounds. For example, de-benzylation may be effected by catalytic hydrogenation, preferably using platinum or palladium as catalyst.

The compounds of the invention when prepared by one of the aforesaid processes in the form of the free basic ethers of ketoximes can be converted into corresponding pharmaceutically acceptable acid-addition or quaternary ammonium salts by methods known per se, e.g., by dissolving the basic ether in an inert anhydrous organic solvent and adding a solution of the desired acid or ester, preferably in the same or in a homogeneously miscible solvent and causing the salt to precipitate.

The term "methods known per se" as used in this specification means methods heretofore used or described in the literature.

The following examples in which the temperatures mentioned are in degrees centigrade illustrate the preparation of ethers of ketoximes of the present invention:

Example I 17.6 g. (0.08 mol) of 10,11-dihydro-5H-dibenzo[a,d]cyclohepten-5-one oxime are added to a solution of 1.85 g. (0.08 at.) sodium in 250 ml. ethanol. The solution is boiled under reflux. A solution of 13.5 g. (0.085 mol) of α-3-chlorotropane in 50 ml. of ethanol is added dropwise to the refluxing liquid with stirring during the course of one hour. The reactiton mixture is refluxed for another 15 hours, after which it is filtered to remove the sodium chloride formed. The filtrate is concentrated and the residue is taken up in diethyl ether. The solution is washed four times with a weak sodium hydroxide solution and four times with water. The organic layer is separated, dried with sodium sulphate and concentrated. 25 g. of crude 10,11 - dihydro-5H-dibenzo[a,d]cyclohepten-5-one O-(3α-tropanyl)oxime are obtained. A crystalline salt is formed with oxalic acid. Crystallizatiton from a mixture of methanol and acetone gives the pure oxalate in a yield of 70%; melting point 214–215°.

*Analysis.*—Calculated for $C_{25}H_{28}NO_5$, percent: C, 68.79; H, 6.47; N, 6.42. Found, percent: C, 68.7; H, 6.4; N, 6.7.

Example II

Following the procedure described in Example I but substituting an equivalent amount of 5H-dibenzo[a,d]cyclohepten-5-one oxime for the 10,11-dihydro-5H-dibenzo[a,d]cyclohepten-5-one oxime, the oxalate of 5H-dibenzo[a,d]cyclohepten-5-one O-(3α-tropanyl)oxime is obtained in a yield of 70%; melting point 213–214°.

*Analysis.*—Calculated for $C_{25}H_{26}NO_5$, percent: C, 69.11; H, 6.03; N, 6.45. Found, percent: C, 69.4; H, 6.3; N, 6.6.

Example III

A mixture of 10.2 g. (0.043 mol) of 6,7-dihydrodibenzo[a,d]cycloocten-12(5H)-one oxime and 2.1 g. (0.043 mol) 50% sodium hydride in 110 ml. anhydrous xylene is refluxed with stirring for one hour. After cooling to 25°, 6.85 g. (0.043 mol) of α-3-chlorotropane in 60 ml. xylene is added dropwise, after which the mixture is refluxed for another 25 hours. The mixture obtained is decomposed with water. The organic layer is separated, washed five times with water and dried with sodium sulphate. The solvent is evaporated. Remaining α-3-chlorotropane is removed by distillation (B.P. 40°/0.5 mm.). The residue is dissolved in ether and treated with fumaric acid. The fumarate is crystallized from a mixture of ethanol and ether. 5 g. of 6,7-dihydrodibenzo[a,d]cycloocten-12(5H)-one O-tropan-3α-yloxime fumarate are obtained. Yield 25%; melting point 211–214°.

*Analysis.*—Calculated for $C_{24}H_{28}N_2O$, ½ $C_4H_4O_4$, percent: C, 74.61; H, 7.22; N, 6.69. Found, percent: C, 74.5; H, 7.2; N, 6.6.

In the same way as described in Example I, or by one of the other methods disclosed in the specification, compounds of Formula I may be prepared in which either or both $R_1$ and $R_2$ represent a halogen (e.g., chlorine or bromine) atom or an alkyl (e.g., methyl, ethyl or isopropyl) group and $R_3$ represents a hydrogen atom or an alkyl (e.g., ethyl, isopropyl or octyl) group, for example, the products 1-methyl-5H-dibenzo[a,d]cyclohepten-5-one O-(3α-nortropanyl)oxime,
3-bromo-10,11-dihydro-5H-dibenzo[a,d]cyclohepten-5-one O-(8-ethyl-3α-nortropanyl)oxime,
6,7-dihydro-2-methyldibenzo[a,d]-cycloocten-12(5H)-one O-(8-isopropyl-3α-nortropanyl)oxime,
3-chloro-5H-dibenzo[a,d]cyclohepten-5-one O-(8-tert.-butyl-3α-nortropanyl)oxime,
1-fluoro-6,7-dihydrodibenzo[a,d]cycloocten-12(5H)-one O-(8-octyl-3α-nortropanyl)oxime.

The invention includes within its scope pharmaceutical preparations containing as active ingredient, a compound of Formula I, or non-toxic acid-addition or quaternary ammonium salt thereof, in association with a pharmacologically acceptable carrier. The preparations may take any of the forms customarily employed for administration of therapeutically active substances, but the preferred types are those suitable for oral administration and especially tablets, pills and capsules, including the substance. The tablets and pills may be formulated in the usual manner with one or more pharmacologically acceptable diluents or excipients, such as lactose or starch, and include materials of a lubricating nature such as magnesium or calcium stearate, and colouring substances. Capsules made of adsorbable material, for example gelatin, may contain the active substance alone or in admixture with a solid or liquid diluent. Liquid preparations may be in the form of suspensions, emulsions, syrups or elixirs of the active substance in water or other liquid medium commonly used for making orally acceptable pharmaceutical formulations, for example paraffin, or a syrup or elixir base. The active substance may also be made up in a form suitable for parenteral administration, i.e., as a suspension or emulsion in sterile water or an organic liquid usually employed for injectable preparations, for example a vegetable oil such as olive oil, or a sterile solution in an organic solvent.

The invention may be variously embodied within the scope of the appended claims.

What is claimed is:

1. A compound selected from the group consisting of bases of the formula

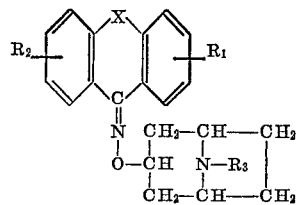

and the pharmaceutically acceptable acid-addition and quaternary ammonium salts thereof, wherein X is selected from the group consisting of —$CH_2$—$CH_2$—, —$CH_2$—$CH_2$—$CH_2$— and —CH=CH—; $R_1$ and $R_2$ are selected from the group consisting of hydrogen, halogen and alkyl; $R_3$ is selected from the group consisting of hydrogen and alkyl.

2. A compound in accordance with claim 1 wherein X is —$CH_2$—$CH_2$—, $R_1$ and $R_2$ are each hydrogen and $R_3$ is methyl.

3. A compound in accordance with claim 2 having the name 10,11 - dihydro-5H-dibenzo[a,d]cyclohepten-5-one O-(3α-tropanyl)oxime.

4. A compound in accordance with claim 2 having the name 10,11-dihydro-5H-dibenzo[a,d]cyclohepten-5-one O-(3α-tropanyl)oxime oxalate.

5. A compound in accordance with claim 1 wherein X is —CH=CH—, $R_1$ and $R_2$ are each hydrogen, and $R_3$ is methyl.

6. A compound in accordance with claim 5 having the name 5H-dibenzo[a,d]cyclohepten-5-one O-(3α-tropanyl)oxime.

7. A compound in accordance with claim 5 having the name 5H-dibenzo[a,d]cyclohepten-5-one O-(3α-tropanyl)oxime oxalate.

8. A compound in accordance with claim 1 wherein X is —CH$_2$—CH$_2$—CH$_2$—, $R_1$ and $R_2$ are each hydrogen, and $R_3$ is methyl.

9. A compound in accordance with claim 8 having the name 6,7-dihydro-dibenzo[a,d]cycloocten-12(5H)-one O-(3α-tropanyl)oxime.

10. A compound in accordance with claim 8 having the name 6,7-dihydro-dibenzo[a,d]cycloocten-12(5H)-one O-(3α-tropanyl)oxime fumarate.

References Cited

UNITED STATES PATENTS 3,396,168   8/1968   Corts _____ 260—292

JOHN D. RANDOLPH, *Primary Examiner.*

A. L. ROTMAN, *Assistant Examiner.*

U.S. Cl. X.R.

260—256, 566, 999

PO-1050
(5/69)

UNITED STATES PATENT OFFICE
CERTIFICATE OF CORRECTION

Patent No. 3,454,580                    Dated July 8, 1969

Inventor(s) Cornelis van der Stelt

It is certified that error appears in the above-identified patent and that said Letters Patent are hereby corrected as shown below:

Column 4, formula VIII, that portion of the formula reading

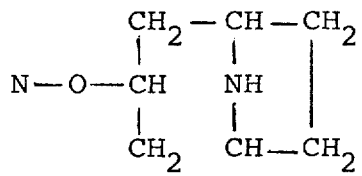    should read    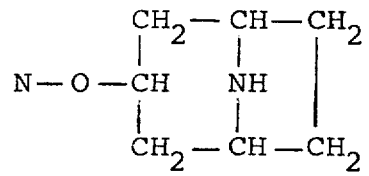

SIGNED AND
SEALED
DEC 23 1969

(SEAL)
Attest:

Edward M. Fletcher, Jr.
Attesting Officer

WILLIAM E. SCHUYLER, JR.
Commissioner of Patents